United States Patent
English

(10) Patent No.: US 8,256,070 B2
(45) Date of Patent: Sep. 4, 2012

(54) SPLIT ARM CLIP

(75) Inventor: Alfred English, Santa Monica, CA (US)

(73) Assignee: Sleeve Clips, LLC, Santa Monica, CA (US)

( * ) Notice: Subject to any disclaimer, the term of this patent is extended or adjusted under 35 U.S.C. 154(b) by 380 days.

(21) Appl. No.: 12/688,685

(22) Filed: Jan. 15, 2010

(65) Prior Publication Data

US 2011/0173782 A1   Jul. 21, 2011

(51) Int. Cl.
*F16B 2/10*  (2006.01)

(52) U.S. Cl. .......................................... 24/507; 24/510

(58) Field of Classification Search ............... 24/67 R, 24/67.3, 67.5, 67.7, 67.11, 507–511
See application file for complete search history.

(56) References Cited

U.S. PATENT DOCUMENTS

| | | | |
|---|---|---|---|
| 77,268 A | 4/1868 | Finley | |
| 556,503 A | 3/1896 | Jacobson | |
| 670,027 A * | 3/1901 | Malmberg | 40/636 |
| 1,477,256 A | 12/1923 | Fritz | |
| 1,586,656 A | 6/1926 | Corey | |
| 1,865,453 A | 7/1932 | Baltzley | |
| 2,000,923 A * | 5/1935 | Colbiornsen | 24/15 |
| 3,462,809 A | 8/1969 | Froehlich, Jr. | |
| 3,962,758 A | 6/1976 | Knappe et al. | |
| 5,546,641 A | 8/1996 | Radvin et al. | |
| 5,615,454 A | 4/1997 | Contarino | |
| 5,946,778 A | 9/1999 | McGarity | |
| 6,021,933 A * | 2/2000 | Zuckerman | 223/96 |
| 2003/0101551 A1 | 6/2003 | Levesque | |
| 2006/0213036 A1 | 9/2006 | Flowers et al. | |
| 2006/0277725 A1 * | 12/2006 | Weingartner | 24/67 R |

FOREIGN PATENT DOCUMENTS

JP   2005-144126 A   6/2005

OTHER PUBLICATIONS

English Language Abstract for Japanese Patent JP 2005-144126-A, dated 2005.

* cited by examiner

*Primary Examiner* — James Brittain
(74) *Attorney, Agent, or Firm* — Fox Rothschild, LLP; Robert J. Sacco

(57) ABSTRACT

A split arm clip includes first and second arms that are connected to each other at a first end by an end section and which press against one another at a second end opposite the first end. The first arm is split into first and second arm portions that are substantially flush when the clip is a closed, in use state. The first arm portion is integrally connected to the end section and the second arm portion includes a lever that is adjacent the first arm portion and which does not extend past the end section. A hinge is disposed between the first and second arm portions along a pivot axis extending in a transverse direction of the clip parallel the end section. The pivot axis is disposed between the first and second ends inside of the clip such that a force applied to the lever urges apart the first and second arms at the second end.

21 Claims, 5 Drawing Sheets

SPLIT ARM CLIP

FIELD

The present invention relates generally to clips, and more specifically to a split arm clip for shirt sleeves.

BACKGROUND

Many types of clips are available for fastening together a wide variety of different parts and materials. Due to the wide range of applications in which clips are needed, there are also a wide array of different clip designs that may be suitable for one application and unsuitable for another. One such application where many types of conventional clips are unsuitable is for fastening together clothing or textiles.

One type of clip that is known for clothing is a u-shaped clip with opposed arms formed from metal, wherein the bend in the metal biases one arm toward the other when a material is inserted between the arms. Examples of u-shaped clothing clips of this kind are described in U.S. Pat. Nos. 1,586,656 and 2,000,923 and U.S. Patent Application Publication Nos. 2003/0101551 and 2006/0213036. The problem with these types of clips is that the clamping force decreases significantly over time as the bend in the metal weakens and the arms spread apart, thereby permanently reducing the clamping force and making it likely that the clip will fall off or not adequately hold the clothing. For example, where such a clip is used to clamp a thicker material, such as a towel, plastic deformation of the u-shaped bend will occur and make it unsuitable to later clamp a thinner material, such as the sleeve of a shirt.

A variation of the u-shaped clips includes opposed jaws on the interior of the arms to facilitate a grip on the material. Examples of this type of clip are described in U.S. Pat. Nos. 3,962,758 and 5,546,641. In addition to having the same above-described problems associated with the use of u-shaped clips, the jaws can cause pulls or tears in the clothing material or scratch the skin of the wearer.

Another type of clip that is known for clothing is an alligator clip which has two arms that are connected in a central region by a spring so that the arms are biased against each other at a first end and form separated levers on the other end. By pressing together the levers, the jaws of the clip at the other end separate. An example of one such clip is described in U.S. Pat. No. 5,615,454. In addition to the problems associated with jaws described above, the levers are also problematic when used on clothing. First, the levers are separated when the alligator clip is in a closed state and therefore create bulky and uncomfortable protrusions. Further, these protrusions from the body of the clip which can likewise catch on the clothing to cause tears or pulls or irritate the skin of the user.

A similar problem is present in binder clips, such as the type described in U.S. Pat. No. 1,865,453, which rely on movable levers and also include rolled-outward protrusions at the clamping section. In addition to the levers forming protrusions which make the clip bulky and uncomfortable for many applications, any movement by the levers while an object is clipped make the clip even more bulky and increase the likelihood the levers will catch on material and release. Likewise, m-clips, such as the type described in U.S. Pat. No. 5,946,778, rely on movable levers that can catch or be inadvertently moved to extend outside the body of the clip to form bulky and uncomfortable protrusions which can, in turn, cause the clip to release or material to be caught. Both the binder clips and the m-clips, like typical u-shaped clips, rely on the arms being biased against one another through an end section that is put into tension. Due to the varying degree of tension forces applied at the u-shaped portion, the clip will deform the material of the clip and decrease the ability of the clip to sufficiently bind material together.

SUMMARY

The present invention provides a clip that overcomes the problems of the prior art. The clip is biased by a hinge to maintain a consistently sufficient retention force for clothing and other articles and is configured to be substantially flush on all sides so as to prevent problems associated with different types of protrusions.

In an embodiment, the present invention provides first and second arms that are connected to each other at a first end by an end section and which press against one another at a second end opposite the first end. The first arm is split into first and second arm portions that are substantially flush when the clip is in a closed, in use state. The first arm portion is integrally connected to the end section and the second arm portion includes a lever that is adjacent the first arm portion and which does not extend past the end section. A hinge is disposed between the first and second arm portions along a pivot axis extending in a transverse direction of the clip parallel the end section. The pivot axis is disposed between the first and second ends inside of the clip such that a force applied to the lever urges apart the first and second arms at the second end.

BRIEF DESCRIPTION OF THE DRAWINGS

The foregoing and other features of the present invention will be more readily apparent from the following detailed description and drawings of illustrative embodiments of the invention in which.

Like reference numerals are used in the drawing figures to connote like components of the clip.

DETAILED DESCRIPTION

Figure 3:
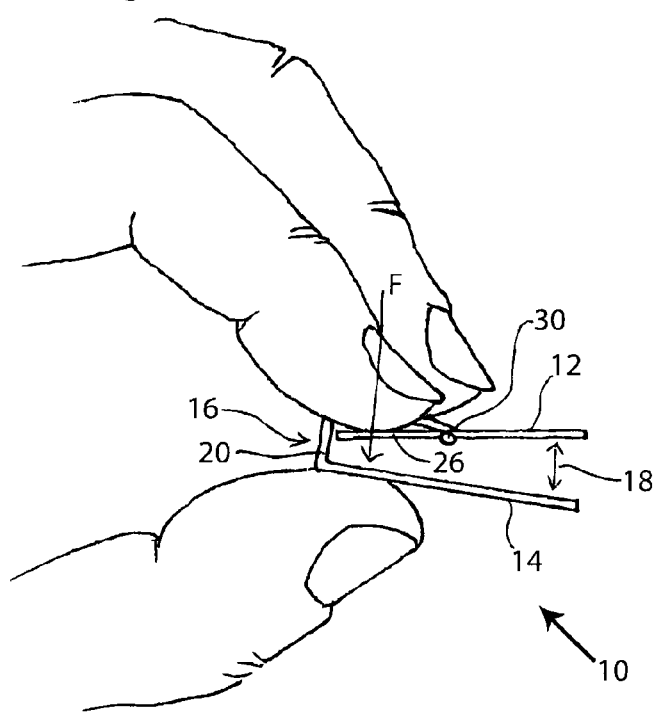
FIG. 3 is a schematic view of a user opening the clip of FIG. 1.
Figure 4:
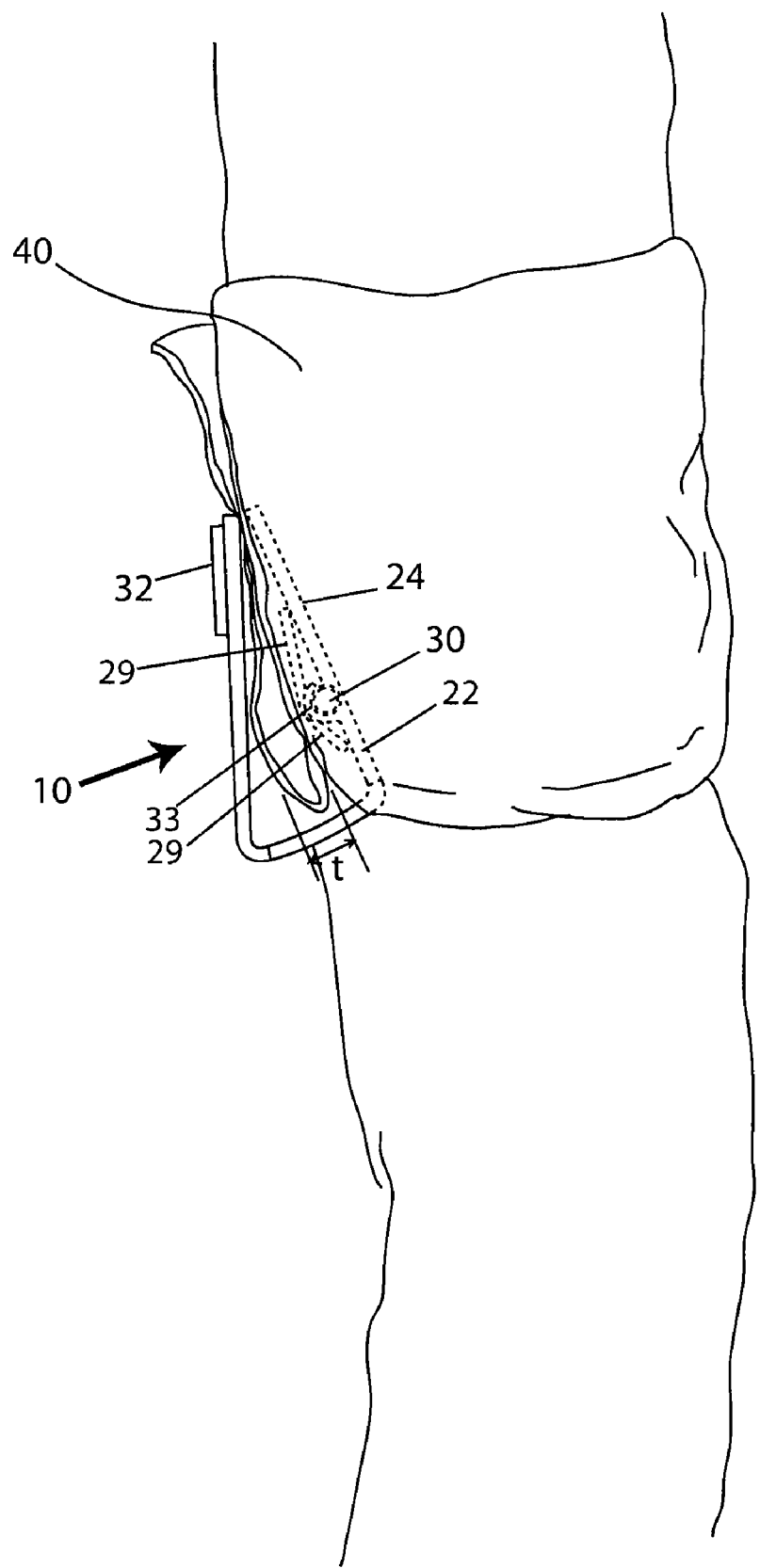
FIG. 4 is a side view of the clip of FIG. 1 in a closed, in use state.

Referring to FIGS. 1-5, a split arm sleeve clip 10 includes a first arm 12 and second arm 14 that are integrally connected to each other at a first end 16 thereof by an end section 20. The first arm 12 is split into a first arm portion 22 and a second arm portion 24. The first arm portion 22 is integrally connected to the end section 20 and the second arm portion 24 is rotatably connected to the first arm portion 22 by a hinge 30. The second arm portion 24 includes a lever 26 which extends toward the first end 16 in a longitudinal direction of the clip (extending between the first end 16 and the second end 18), but preferably not past the end section 20. In order to open the clip 10, a user applies a downward force to the lever 26 in order to urge apart the second arm portion 24 and the second arm 14 at the second end 18. When the clip 10 is closed, the second arm portion 24 presses against the second arm 14 at the second end 18 so that the rolled-up shirt sleeve 40, or other object(s) to be clipped together, may be held in place therebetween as shown in FIG. 4.

Protruding components and sharp or uneven contours on a clip or other fastening device can cause the material being held by the clip to catch or tear and can likewise pinch, cut or injure a user where the clip is positioned near a user's skin. Accordingly, in embodiments of the present invention, the lever 26 and the first and second arm portions 22, 24 are configured in such a way so as to maintain the outer surfaces of the clip substantially flush and smooth. In embodiments of the clip 10 shown in FIGS. 1-5 and 8-10, respectively, the end section 20 may be provided only across a portion of the width of the clip 10, preferably not extending past the first arm portion 22 in a transverse direction of the clip (extending between a first side 15 and a second side 17). The end of the lever 26 does not extend past the end section 20 in the longitudinal direction of the clip and may be provided at or in front of the end section 20 so as to prevent the lever 26 from forming a protrusion extending outside the body of the clip 10. Since the end section 20 connects the second arm 14 with the first arm portion 22 and is not disposed beneath or behind the lever 26, a user is free to open the clip 10 from the first end 16 easily by applying a downward force F on the lever 26 as shown in FIG. 3.

Figure 6:
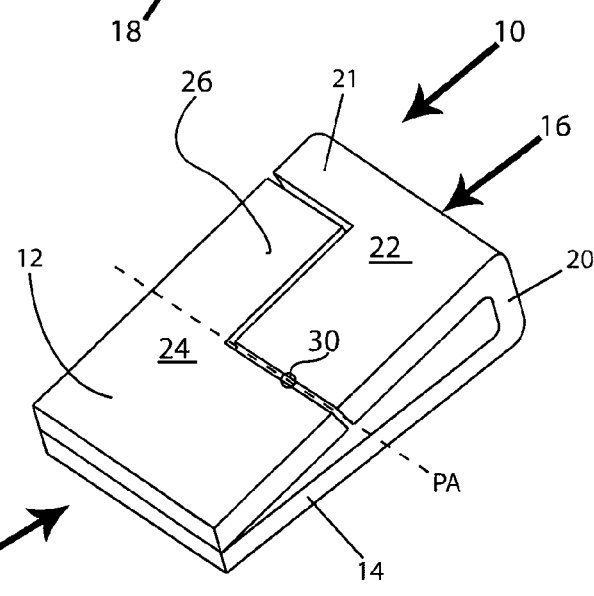
FIG. 6 is a rear perspective view of a clip according to a second embodiment of the present invention.

However, in the embodiment shown in FIG. 6, the end section 20 may alternatively extend across the entire width of the clip 10 in the transverse direction of the clip 10, in which case the lever 26 is preferably disposed in a longitudinal direction of the clip 10 entirely in front of the end section 20 so that the lever 26 may be operated without protruding outside of the body of the clip 10. The first arm portion 22 can also include an extension 21 such that the first arm portion 22 is provided across the entire width of the clip 10 as shown in FIG. 6. However, in this case, the extension 21 extends from the end section 20 in the longitudinal section of the clip only partially toward the pivot axis PA and the lever 26 is disposed entirely disposed in front of the extension 21 in the longitudinal direction of the clip 10.

Figure 1:
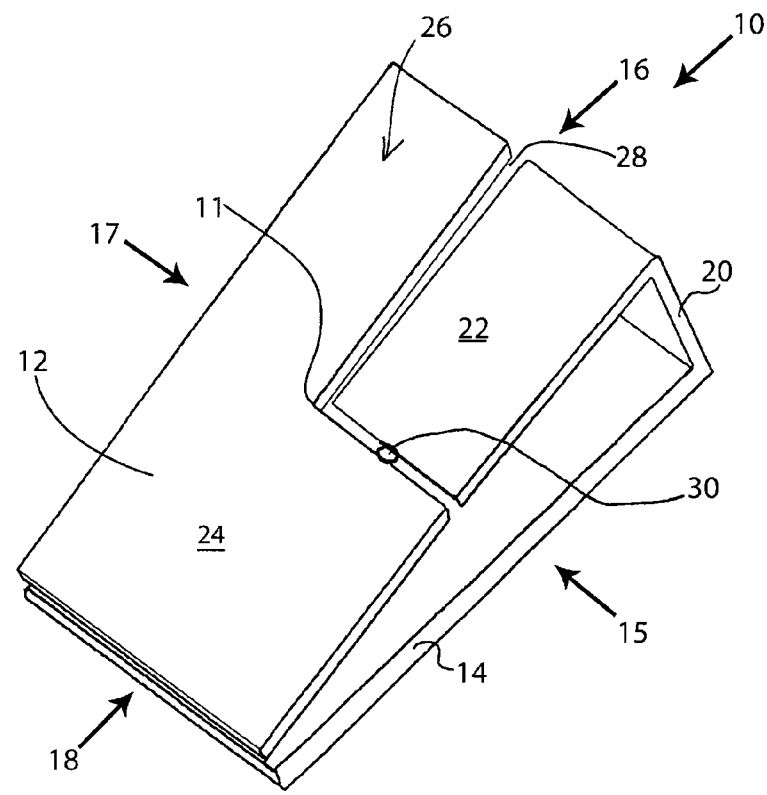
FIG. 1 is a rear perspective view of a clip according to a first embodiment of the present invention in a closed, unused state.
Figure 2:
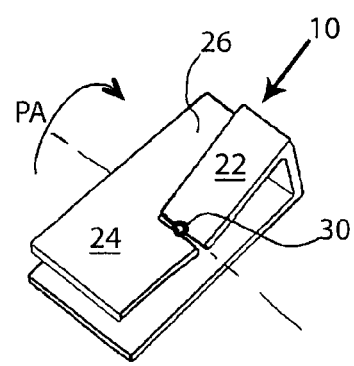
FIG. 2 is a perspective view of the clip of FIG. 1 in an open state.

Additionally, the lever 26, in the closed, unused state shown in FIG. 1, may be provided above the first arm portion 22 with a small allowance or offset 28 in order to account for the thickness t of a material that is to be held by the clip 10, for example, a rolled-up shirt sleeve 40 as shown in FIG. 4. Accordingly, the lever 26, in the closed, in use state shown in FIG. 4, is substantially flush with the first arm portion 22 since the allowance 28 provides material allowance for a material of predetermined thickness t. For example, the clip 10 may have a particular allowance 28 such that it is configured to hold a rolled-up shirt sleeve 40 and a different allowance 28 where the clip 10 is configured to hold different objects or materials, such as scarves or paper.

Figure 8:
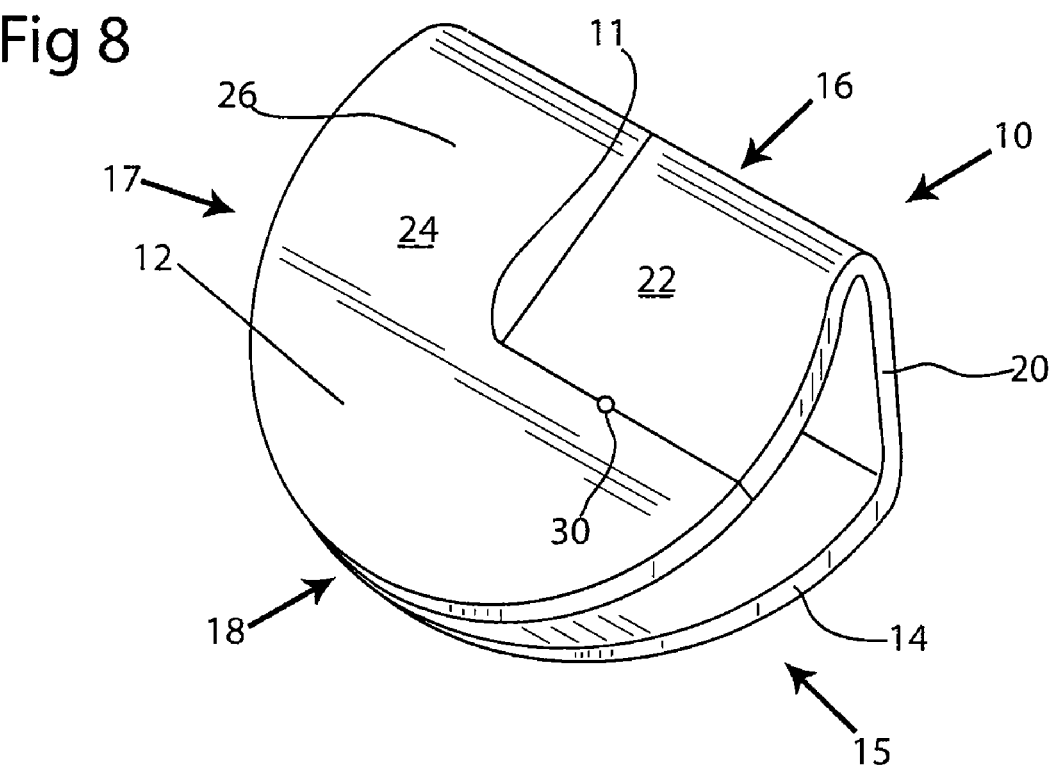
FIG. 8 is a rear perspective view of a clip according to a fourth embodiment of the present invention.

Referring to FIGS. 1 and 8, the first arm 12 of the clip 10 is split into the first and second arm portions 22, 24 from a first side 15 of the clip toward the center 11 of the clip in the transverse direction of the clip and perpendicularly therefrom to the end section 20 of the clip in the longitudinal direction of the clip 10. Preferably, the splits in the transverse and longitudinal directions of the clip 10 extend approximately to the mid-point of the first arm 12.

Referring to FIGS. 1-4, 6 and 8-10, the first and second arm portions 22, 24 of the first arm 12 are pivotably connected to each other by a springed hinge 30 along a pivot axis PA extending in the transverse direction of the clip 10. The springed hinge 30 may be any form of hinge which allows the second arm portion 24 to rotate relative the first arm portion 22 and which is biased about the pivot axis PA toward the second arm 14. This may be achieved, for example, using a spring 33 having opposed legs 29 extending on either side of the pivot axis PA. Thus, when a user applies a force F to the lever 26 as shown in FIG. 3, the second arm portion 24 is free to rotate about the pivot axis PA relative to the first arm portion 22 and the second arm 14 so that the clip 10 transitions into an open state shown in FIG. 2. In the open state, material may be positioned between the second arm 14 and the second arm portion 24. Upon releasing the lever 26, the clip 10 provides a clamping force on the object(s) to be fastened, here a rolled-up shirt sleeve 40. This clamping force may be adjusted by changing the spring constant of the spring 33. Preferably, the end section 20 separates the first arm portion 22 from the second arm 14 at a distance that is equal to or greater than the material thickness t, so that the end section 20 is not put into tension and does not deform as in the case of a typical U-shaped clip. This increases the life of the clip 10 by preventing the first and second arms 12, 14 from gradually spreading apart over the course of continued use.

As shown in FIG. 4, the first and second arm portions 22, 24 are aligned to have substantially parallel surfaces so that the first arm 12 is essentially flat and flush when the clip 10 is in the closed, in use state. The spring 33, including legs 29, may be disposed on the inside of the clip 10, between first and second arms 12, 14 as shown in FIG. 4 so as to hide it from view and maintain the flatness of the outer surface of first arm 12. However, in some embodiments, the spring 33 is very small and may be instead disposed partially or fully on the outer surface of first arm 12 without detracting from the flatness. The positioning of the spring 33 outside of the clip is particularly advantageous where a delicate material is being held by the clip 10. For example, the spring 33 may be positioned on the outside next to the a user's arm to hold up a rolled-up shirt sleeve 40 since the small size and smooth outer contours of the spring 33 would not cause irritation to a user's skin, but could pinch or tear the more delicate material of the shirt if positioned on the inside. Accordingly, the clip 10 is particularly advantageous for clipping clothing, such as a rolled-up shirt sleeve 40, in that the first arm 12 can be safely and comfortably positioned adjacent a user's skin without any protrusions or sharp points that could cause catches, cuts or other harm to the user or the user's clothing.

Figure 5:
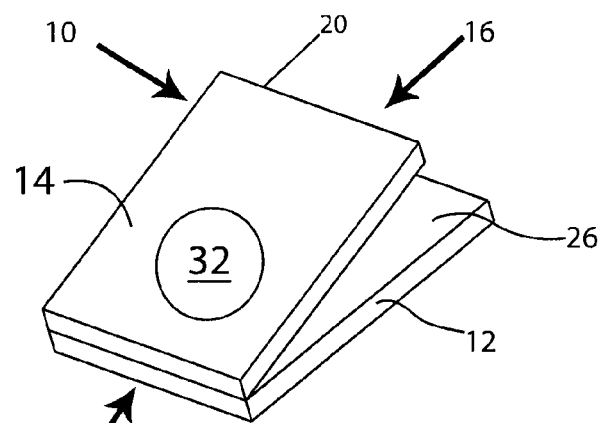
FIG. 5 is a front perspective view of the clip of FIG. 1.

Referring to FIGS. 4 and 5, the second arm 14 is configured to be positioned on the outside of a user's clothing in use and may be provided with a design or decoration 32. For example, the second arm 14 may have a logo or etched writing, for example, a person's initials, or be provided with some other decoration 32, such as a jewel.

Figure 9:
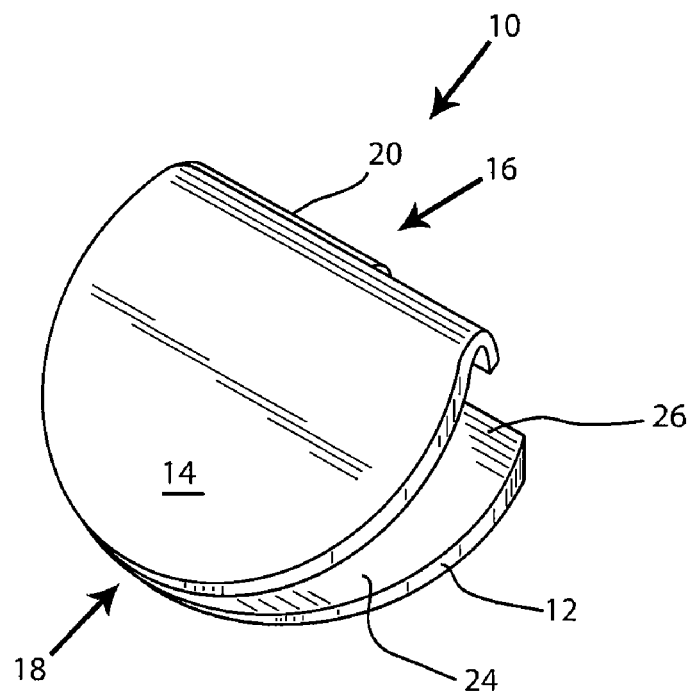
FIG. 9 is a front perspective view of the clip of FIG. 8.
Figure 10:
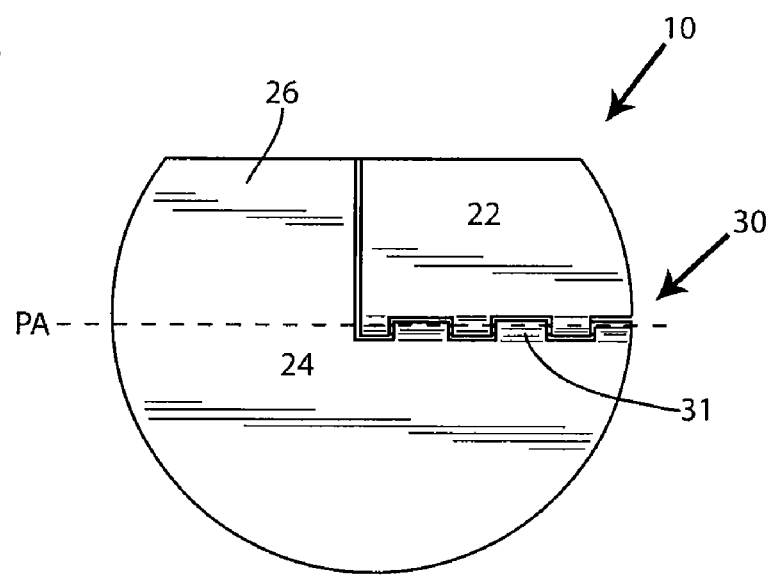
FIG. 10 is a rear view of the clip of FIG. 8 including more detail on a springed hinge of the clip.

The clip 10 may be provided in a variety of sizes and shapes depending upon the application. For example, the clip 10 may be substantially rectangular (FIGS. 1-7) or may be circular or semi-circular (FIGS. 8-10). In one embodiment, the clip 10 is used to hold together a rolled-up shirt sleeve (FIG. 4), but also may be used in any number of other applications such as to hold other clothing articles in place, such as rolled-up pants, ties (for example, by clipping the back of the tie to the front of a shirt) or scarves, or the clip 10 may be used as a money clip, a paper clip or as clip-on earrings. The clip 10 can be configured to a particular application by adjusting, inter alia, the size (for example, making end section 20 larger to create more space for thicker materials), the spring force of the spring 33 and/or the allowance 28.

Figure 7:
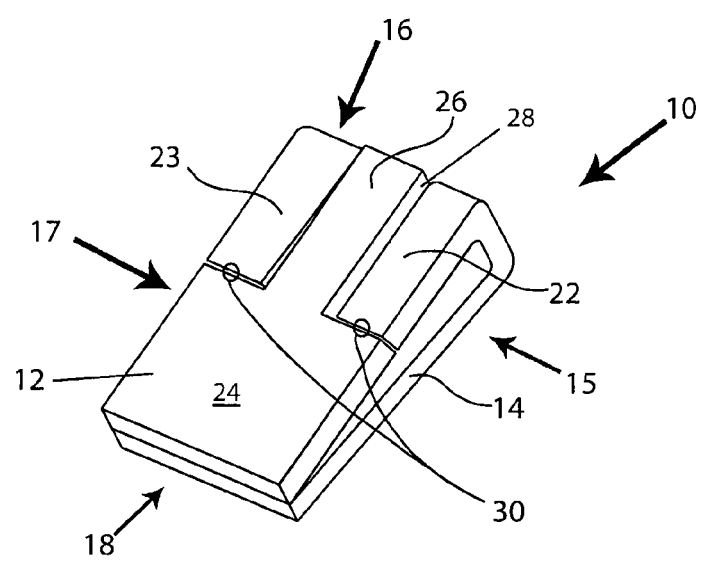
FIG. 7 is a rear perspective view of a clip according to a third embodiment of the present invention.

In an alternative embodiment of the clip 10 shown in FIG. 7, the first arm 12 is split into an additional third arm portion 23 and the lever 26 is disposed between the first and third arm portions 22, 23. The first and third arm portions 22, 23 are each integrally connected to the end portion 20 and are pivotably connected to the second arm portion 24 through a pair of springed hinges 30. In this embodiment, the symmetrical positioning of the springed hinges 30 along the pivot axis in the transverse direction of the clip 10 provides additional stability when opening and closing the clip 10 by balancing the reaction forces for force F between the equally spaced springed hinges 30 disposed on each side of the lever 26.

The clip 10 may be formed from a variety of different materials depending on the application. For example, where a large number of inexpensive clips are necessary, for example, for holding papers together, the clip 10 is preferably molded from plastic with the springed hinge 30 positioned in the mold or subsequently applied, or formed from an inexpensive metal. On the other hand, where the clip 10 is used to hold money or clothing, a rigid material that is aesthetically pleasing, such as a coated or precious metal (for example, gold, silver, platinum, etc.) is preferred. Likewise, where the clip 10 is to be configured for use as clip-on earrings, or as another form of jewelry, a coated or precious metal is preferred. The body of the clip 10 may be blanked from a sheet of metal material. For example, the second arm 14 may be formed as a flat piece and bent to integrally form the end section 20 and the first arm portion 22. The second arm portion 24 can likewise blanked from the same sheet of material in the same or a separate operation. The springed hinge 30 is applied to pivotably connect the first and second arm portions 22, 24 by any known means. For example, the springed hinge 30 may be a common butt hinge 31 as shown in FIG. 10, in which alternating extensions of the first and second arm portions 22, 24 are wrapped inwardly about a rod and biased from the inside of the clip 10 by a spring 33. In order to create the allowance 28, the lever 26 may be bent upwards from the flat sheet used to form the second arm portion 24 or the nominal positioning of the legs 29 of the spring 33 on the first and second arm portions 22, 24 may be adjusted.

While the invention has been particularly shown and described with reference to preferred embodiments thereof, it will be understood by those skilled in the art that various changes in form and details may be made therein without departing from the spirit and scope of the invention. Accordingly, the invention is to be limited only by the scope of the claims and their equivalents.

What is claimed is:

1. A split arm clip comprising:
    first and second arms that are connected to each other at a first end by an end section and which press against one another at a second end opposite the first end, wherein the first arm is split into first and second arm portions that are substantially flush when the clip is in a closed, in use state, the first arm portion being integrally connected to the end section and the second arm portion including a lever that is adjacent the first arm portion and which does not extend past the end section; and
    a springed hinge disposed between the first and second arm portions along a pivot axis extending in a transverse direction of the clip parallel the end section, the pivot axis being distal to the second arm and supported only by the first and second portions of the first arm thereby defining a gap between the first and second arms spanning the width of the clip and disposed between the first and second ends such that a force applied to the lever urges apart the first and second arms at the second end.

2. The split arm clip according to claim 1, wherein the first arm further comprises a third arm portion integrally connected to the end section and pivotably connected to the second arm portion by an additional springed hinge along the pivot axis, the lever being disposed between the first and third arm portions.

3. The split arm clip according to claim 2, wherein the end section is provided only between the second arm and the first and third arm portions, and does not extend behind the lever in a longitudinal direction of the clip.

4. The split arm clip according to claim 2, wherein the first and third arm portions are substantially equal in size and disposed symmetrically on each side of the lever in the transverse direction of the clip.

5. The split arm clip according to claim 1, wherein the lever is disposed with an allowance above the second arm portion when the clip is in a closed, unused state so as to allow for the thickness of a material to be held by the clip in the closed, in use state.

6. The split arm clip according to claim 1, wherein the clip is configured to hold a rolled-up shirt sleeve.

7. The split arm clip according to claim 1, further comprising a decoration disposed on an outer surface of at least one of the first and second arms.

8. The split arm clip according to claim 1, wherein the clip is substantially rectangular.

9. The split arm clip according to claim 1, wherein the clip is semi-circular.

10. The split arm clip according to claim 1, wherein the end section is provided only between the first arm portion and the second arm, and does not extend behind the lever in a longitudinal direction of the clip.

11. The split arm clip according to claim 1, wherein the first arm portion is split from the second arm portion at a mid-point of the first arm to the first end and at the mid-point to a side of the clip along the pivot axis.

12. The split arm clip according to claim 1, wherein the end section extends fully across the clip in the transverse direction and the lever is positioned in front of the end section in the longitudinal direction of the clip.

13. The split arm clip according to claim 12, wherein the first arm portion extends with the end section fully across the clip in the transverse direction.

14. The split arm clip according to claim 1, wherein the springed hinge is a butt hinge that is biased by a spring.

15. The split arm clip according to claim 1, wherein the clip is formed from a flat sheet of metal material.

16. The split arm clip according to claim 15, wherein the clip includes a precious metal.

17. The split arm clip according to claim 1, wherein the clip is molded from a plastic material.

18. The split arm clip according to claim 1, wherein the end section separates the first arm portion and the second arm at a distance that is greater than or equal to a thickness of a material to be held by the clip in the closed, in use state.

19. A split arm clip configured to fasten one or more objects of a predetermined thickness together, the clip comprising:
    first and second arms that are connected to each other at a first end by an end section and which press against one another at a second end opposite the first end, the first arm being split into at least first and second arm portions in a transverse direction of the clip and in a longitudinal direction of the clip;

a springed hinge disposed at the split between the first and second arm portions along a pivot axis that extends in the transverse direction of the clip parallel the end section, the pivot axis being distal to the second arm and supported only by the first and second portions of the first arm thereby defining a gap between the first and second arms spanning the width of the clip; and a lever integrally formed with the second arm portion extending along the split between the first and second arm portions in the longitudinal direction of the clip, but not extending past the end section, the lever including an allowance above the first arm portion such that the first and second arm portions are substantially flush when the clip is fastening the objects together.

20. A split arm clip for holding a rolled-up shirt sleeve, the clip comprising:

first and second arms that are connected to each other at a first end by an end section and which press against one another at a second end opposite the first end, wherein the first arm is split into first and second arm portions that are substantially flush when the clip is holding the rolled-up shirt sleeve, the first arm portion being integrally connected to the end section and the second arm portion being pivotably connected to the first arm portion by a springed hinge disposed between the first and second arm portions, the springed hinge being distal to the second arm and supported only by the first and second portions of the first arm thereby defining a gap between the first and second arms spanning the width of the clip; and a lever integrally connected to the second arm portion and extending from the springed hinge to a point in front of the end section; and a decoration disposed on an outer surface of the second arm.

21. A split arm clip configured to fasten one or more objects of a predetermined thickness together, the clip comprising:

first and second arms that are connected to each other at a first end by an end section and which press against one another at a second end opposite the first end, the first arm being split into at least first and second arm portions in a transverse direction of the clip and in a longitudinal direction of the clip;

a springed hinge disposed at the split between the first and second arm portions along a pivot axis that extends in the transverse direction of the clip parallel the end section, the pivot axis being distal to the second arm and supported only by the first and second portions of the first arm thereby defining a gap between the first and second arms spanning the width of the clip; and a lever integrally formed with the second arm portion extending along the split between the first and second arm portions in the longitudinal direction of the clip.

* * * * *